Forrest H. Ezzell
INVENTOR.

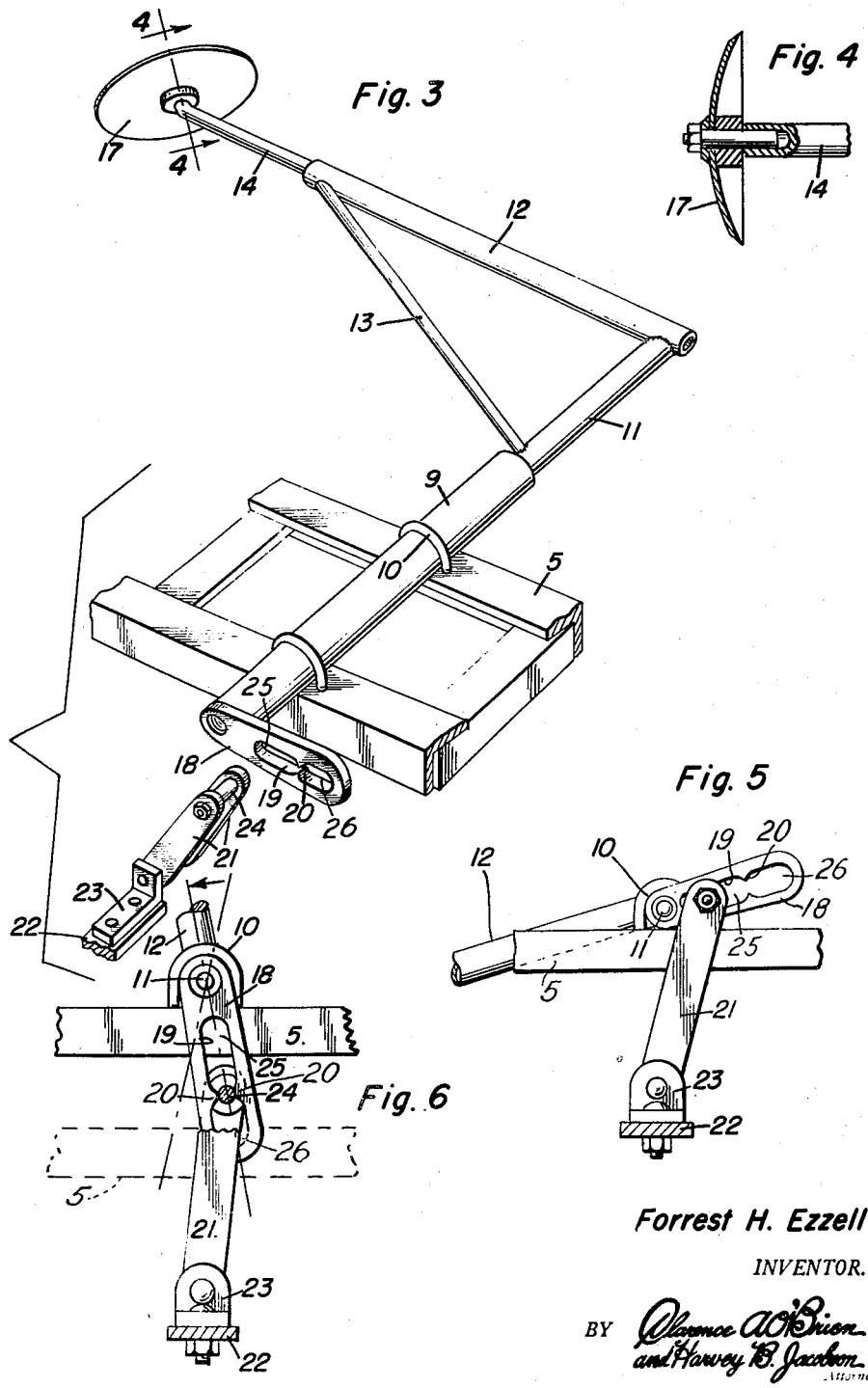

Patented Aug. 26, 1952

2,608,147

UNITED STATES PATENT OFFICE 2,608,147

TRACTOR-MOUNTED ROW MARKER CONTROL MEANS

Forrest H. Ezzell, Shamrock, Tex.

Application March 15, 1950, Serial No. 149,683

2 Claims. (Cl. 97—230)

The present invention relates to new and useful improvements in row markers for corn planters.

An important object of the invention is to provide a marking attachment carried by the lister and planter with mechanism to swing the marker to an opposite side of the planter when the latter is raised to turn the machine at the end of a row.

A further object of the invention is to provide a device of this character whereby the marker is moved from one side of the planter to the other without necessitating the operator leaving his seat on the tractor operating the planter.

A still further object of the invention is to provide a row marker which is attached directly to the planter and lister frame for raising and lowering movement therewith into and out of earth working position together with mechanism for swinging the marker from one side of the planter to the other upon a raising movement of the planter.

Another object is to provide a device of this character simple and practical in construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is an enlarged perspective view of the marker attachment;

Figure 4 is a sectional view of the rotatable mounting for the marker disc;

Figure 5 is a detail in elevation of the cam and operating arm therefor to swing the marker from side to side; and, Figure 6 is a similar view showing the cam in position for raising the marker.

Figure 1:
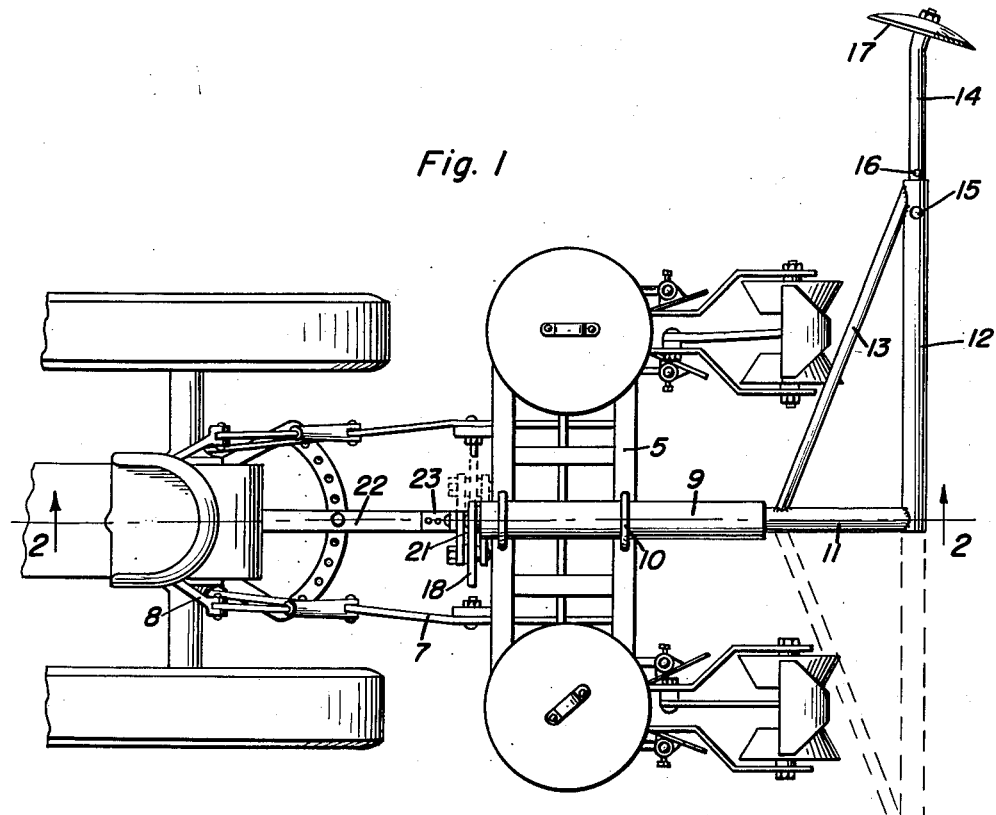
Figure 1 is a top plan view.
Figure 2:
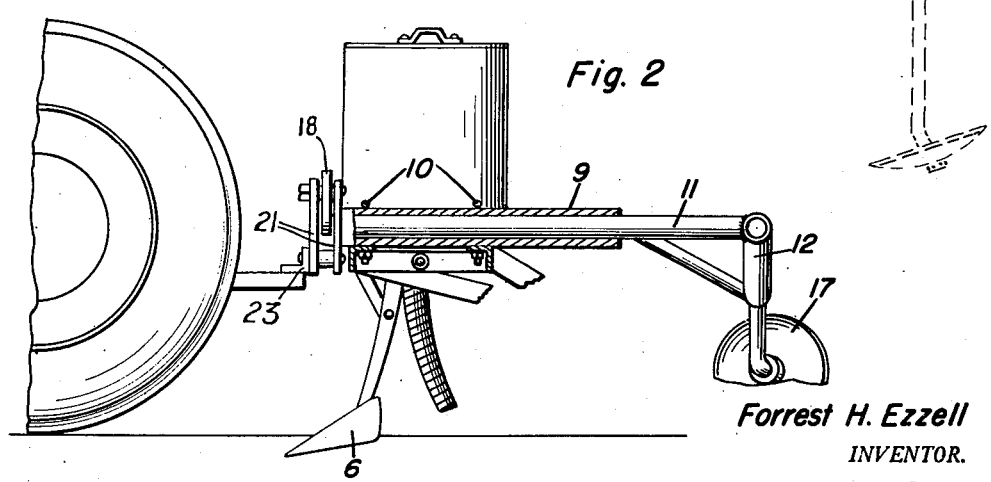
Figure 2 is a longitudinal sectional view taken on the line 2—2 of Figure 1 with parts omitted.

Referring now to the drawings in detail wherein for the purpose of illustration I have disclosed a preferred embodiment of the invention the numeral 5 designates generally a planter frame with the listers 6 supported thereby, the frame being attached in the usual manner to the hydraulic lift arms 8 of a tractor by means of the pivoted planter supporting arms 7 to raise and lower the planter and the listers into and out of earth working position.

A tubular housing or sleeve 9 is secured in a fixed position on frame 5 by means of U-bolts 10 to position the sleeve in a longitudinally extending position.

A shaft 11 is rotatably mounted in housing or sleeve 9 and projects beyond each end of the housing and a laterally extending tubular arm 12 is welded or otherwise suitably secured to the rear end of shaft 11 and provided with a brace 13. A rod 14 is secured in adjusted position inwardly and outwardly at the end of arm 12 by a pin 15 selectively engaged in opening 16 and rod 14 and a marker 17 is rotatably supported at the other end of the rod 14.

An arm 18 is secured to the front end of shaft 11 in a position extending diametrically opposite from arm 12 and arm 18 is formed with a longitudinal slot 19 having relatively narrow inner and outer ends 25 and 26 separated by opposed cams 20.

A pair of roller supporting straps or links 21 are pivoted at one end to the rear end of draw bar 22 of the tractor by means of a bracket 23 and a roller 24 is journaled at the other ends of links 21 for traveling in slot 19.

In the operation of the device the marker arm 12 with the marker 17 at its outer end is supported in a position at one side of planter frame 5 while arm 18 extends in a direction toward the opposite side of the planter and with roller 24 positioned at the inner end of slot 19, as shown in Figure 5.

When the planter frame 5 is raised by lift mechanism 8 when the planter reaches the end of a row, or for other purposes, the sleeve 9 and shaft 11 and arm 12 of the marker are also bodily raised and since roller 24 of links 21 is engaged in slot 19 of arm 18 the arm 18 will swing downwardly as the frame 5 raises to thus rotate shaft 11 in housing or sleeve 9 and swing arm 12 and marker 17 upwardly into the position as shown in Figure 6.

As the roller 24 passes the cams 20 an added impetus is given the arm 18 to swing arm 18 and arm 12 past their perpendicular positions to move arm 12 toward the opposite side of planter frame 5 and arm 12 is held in its raised position by links 21 and roller 24 until the planter is again lowered. The increased width of outer slot 26 tends to prevent return of the arm 18 to its original position after it has passed its perpendicular position in making its arc.

When the planter frame 5 is again lowered, the weight thereof will force roller 24 past hump 20 and the marker arm will also be lowered.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination, a supporting vehicle, an implement frame mounted on said vehicle for vertical movement relative thereto, a row marker and control means therefor, said means comprising a horizontal shaft journaled for rotation on said frame generally centrally thereof, a marker arm fixed to one end of said shaft and extending to one side of said frame for vertical swinging movement from one side of said frame to the other side, a control arm fixed to the other end of said shaft and extending to the side opposite from said marker arm, said control arm having an elongated slot therein, the long axes of said control arm and slot being substantially coincident, opposed cam humps in said slot intermediate its ends, and a link having one end pivoted to said vehicle and the other end carrying a roller traveling in said slot, whereby upon upward movement of the frame the link exerts a pull on the control arm through the roller to swing the control arm and rotate the shaft and the cam humps impart added impetus to swinging of the control arm as the roller travels by the cam humps to swing the marker arm from one side of the frame toward the other side.

2. A row marker according to claim 1, wherein said marker arm and control arm are swingable into aligned position, and said roller engages said humps in the aligned position of said marker arm and control arm to impart added impetus to swinging of the control arm and marker arm past aligned position.

FORREST H. EZZELL.

REFERENCES CITED

The following references are of record in the file of this patent:

UNITED STATES PATENTS

| Number | Name | Date |
|---|---|---|
| 679,186 | Parker | July 23, 1901 |
| 782,381 | Callahan | Feb. 14, 1905 |
| 789,360 | Doak | May 9, 1905 |
| 887,474 | Gouker | May 12, 1908 |
| 969,656 | Rabeck | Sept. 6, 1910 |
| 1,018,581 | Mulvehill | Feb. 27, 1912 |
| 1,211,368 | Garst | Jan. 2, 1917 |
| 1,911,213 | White | May 30, 1933 |